US011264792B2

(12) United States Patent
Takeda (10) Patent No.: US 11,264,792 B2
(45) Date of Patent: Mar. 1, 2022

(54) SECONDARY BATTERY PROTECTION CIRCUIT, SECONDARY BATTERY PROTECTION APPARATUS AND BATTERY PACK

(71) Applicant: Takashi Takeda, Tokyo (JP)

(72) Inventor: Takashi Takeda, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 97 days.

(21) Appl. No.: 16/881,298

(22) Filed: May 22, 2020

(65) Prior Publication Data

US 2020/0381917 A1 Dec. 3, 2020

(30) Foreign Application Priority Data

May 31, 2019 (JP) .............................. JP2019-103263

(51) Int. Cl.
| | |
|---|---|
| *H02J 7/00* | (2006.01) |
| *H02H 7/18* | (2006.01) |
| *H01M 10/44* | (2006.01) |
| *H01M 10/48* | (2006.01) |
| *H01M 50/572* | (2021.01) |

(52) U.S. Cl.
CPC .............. *H02H 7/18* (2013.01); *H01M 10/44* (2013.01); *H01M 10/48* (2013.01); *H01M 50/572* (2021.01); *H02J 7/0031* (2013.01); *H02J 7/00302* (2020.01); *H02J 7/00304* (2020.01); *H02J 7/00306* (2020.01)

(58) Field of Classification Search
CPC ........................................................ H02J 7/18
USPC ........................................................ 320/134
See application file for complete search history.

(56) References Cited

U.S. PATENT DOCUMENTS

| | | | | |
|---|---|---|---|---|
| 6,060,863 A * | 5/2000 | Sakurai | ................. | H02J 7/0031 320/136 |
| 9,490,663 B1 * | 11/2016 | Kim | ........................ | H02J 9/061 |
| 2001/0052759 A1 * | 12/2001 | Sakurai | ................. | H02J 7/0031 320/134 |
| 2009/0160405 A1 * | 6/2009 | Takeda | .............. | H01M 10/0525 320/152 |
| 2012/0229945 A1 * | 9/2012 | Sakurai | .................... | H02H 3/08 361/86 |
| 2017/0133867 A1 * | 5/2017 | Banos | ................... | H02J 7/0068 |

FOREIGN PATENT DOCUMENTS

JP       H11-178224       7/1999

* cited by examiner

*Primary Examiner* — Yalkew Fantu
(74) *Attorney, Agent, or Firm* — IPUSA, PLLC (57) ABSTRACT

A secondary battery protection circuit for protecting a secondary battery, including: a low-voltage detecting circuit configured to detect a voltage across the secondary battery that is lower than a second voltage for low voltage detection, the second voltage being set to be lower than a first voltage for overdischarge detection; and a switching circuit configured to cause a gate of a charge control NMOS transistor to be fixed at a potential at a high side power supply terminal, upon detecting, by the low-voltage detecting circuit, that the voltage across the secondary battery is lower than the second voltage for low voltage detection.

10 Claims, 8 Drawing Sheets

SECONDARY BATTERY PROTECTION CIRCUIT, SECONDARY BATTERY PROTECTION APPARATUS AND BATTERY PACK

CROSS-REFERENCE TO RELATED APPLICATION

This application claims priority under 35 U.S.C. § 119 to Japanese Patent Application No. 2019-103263, filed May 31, 2019, the contents of which are incorporated herein by reference in their entirety.

BACKGROUND OF THE INVENTION

1. Field of the Invention

The present disclosure relates to a secondary battery protection circuit, a secondary battery protection apparatus, a battery pack, and a method for controlling a secondary battery protection circuit.

2. Description of the Related Art

A protection circuit has been known to protect a secondary battery by using a pair of NMOS (N-channel Metal Oxide Semiconductor) transistors that are inserted in a current path being between a positive electrode of the secondary battery and a positive terminal, the positive terminal being connected to a high side power supply terminal of each of a load and a charger (see, e.g., Japanese Unexamined Patent Application Publication No. H11-178224 referred to as Patent document 1).

SUMMARY

The present disclosure provides a secondary battery protection circuit for protecting a secondary battery, the secondary battery protection circuit including:
 a boosting circuit configured to generate a control voltage in response to boosting a voltage across a secondary battery;
 a drive circuit configured to supply the control voltage to a gate of a charge control NMOS transistor and a gate of a discharge control NMOS transistor, the charge control NMOS transistor and the discharge control NMOS transistor being configured to be electrically inserted in a current path that is between a positive electrode of the secondary battery and a high side power supply terminal for each of a load and a charger;
 an overdischarge detecting circuit configured to detect the voltage across the secondary battery that is lower than a predetermined first voltage for overdischarge detection;
 a control circuit configured to operate the drive circuit such that the gate of the discharge control NMOS transistor becomes at low level, upon detecting, by the overdischarge detecting circuit, that the voltage across the secondary battery is lower than the first voltage for overdischarge detection;
 a low-voltage detecting circuit configured to detect the voltage across the secondary battery that is lower than a second voltage for low voltage detection, the second voltage being set to be lower than the first voltage for overdischarge detection;
 an interrupt circuit configured to interrupt a node through which the control voltage is supplied to the gate of the charge control NMOS transistor, such that the node becomes at high impedance, upon detecting, by the low-voltage detecting circuit, that the voltage across the secondary battery is lower than the second voltage for low voltage detection; and
 a switching circuit configured to cause the gate of the charge control NMOS transistor to be fixed at a potential at the high side power supply terminal, upon detecting, by the low-voltage detecting circuit, that the voltage across the secondary battery is lower than the second voltage for low voltage detection.

The present disclosure provides a secondary battery protection apparatus, including:
 a charge control NMOS transistor electrically inserted in a current path that is between a positive electrode of a secondary battery and a high side power supply terminal for each of a load and a charger;
 a discharge control NMOS transistor electrically inserted in the current path;
 a boosting circuit configured to generate a control voltage in response to boosting a voltage across the secondary battery;
 a drive circuit configured to supply the control voltage to a gate of the charge control NMOS transistor and a gate of the discharge control NMOS transistor;
 an overdischarge detecting circuit configured to detect the voltage across the secondary battery that is lower than a predetermined first voltage for overdischarge detection;
 a control circuit configured to operate the drive circuit such that the gate of the discharge control NMOS transistor becomes at low level, upon detecting, by the overcharge detecting circuit, that the voltage across the secondary battery is lower than the first voltage for overcharge detection;
 a low-voltage detecting circuit configured to detect the voltage across the secondary battery that is lower than a second voltage for low voltage detection, the second voltage being set to be lower than the first voltage for overdischarge detection;
 an interrupt circuit configured to interrupt a node through which the control voltage is supplied to the gate of the charge control NMOS transistor, such that the node becomes at high impedance, upon detecting, by the low-voltage detecting circuit, that the voltage across the secondary battery is lower than the second voltage for low voltage detection; and
 a switching circuit configured to cause the gate of the charge control NMOS transistor to be fixed at a potential at the high side power supply terminal, upon detecting, by the low-voltage detecting circuit, that the voltage across the secondary battery is lower than the second voltage for low voltage detection.

The present disclosure provides a battery pack, including:
 a secondary battery including a positive electrode;
 a charge control NMOS transistor electrically inserted in a current path that is between the positive electrode of the secondary battery and a high side power supply terminal for each of a load and a charger;
 a discharge control NMOS transistor electrically inserted in the current path;
 a boosting circuit configured to generate a control voltage in response to boosting a voltage across the secondary battery;
 a drive circuit configured to supply the control voltage to a gate of the charge control NMOS transistor and a gate of the discharge control NMOS transistor;
 an overdischarge detecting circuit configured to detect the voltage across the secondary battery that is lower than a predetermined first voltage for overdischarge detection;

a control circuit configured to operate the drive circuit such that the gate of the discharge control NMOS transistor becomes at low level, upon detecting, by the overdischarge detecting circuit, that the voltage across the secondary battery is lower than the first voltage for overdischarge detection;

a low-voltage detecting circuit configured to detect the voltage across the secondary battery that is lower than a second voltage for low voltage detection, the second voltage being set to be lower than the first voltage for overdischarge detection;

an interrupt circuit configured to interrupt a node through which the control voltage is supplied to the gate of the charge control NMOS transistor, such that the node becomes at high impedance, upon detecting, by the low-voltage detecting circuit, that the voltage across the secondary battery is lower than the second voltage for low voltage detection; and a switching circuit configured to cause the gate of the charge control NMOS transistor to be fixed at a potential at the high side power supply terminal, upon detecting, by the low-voltage detecting circuit, that the voltage across the secondary battery is lower than the second voltage for low voltage detection.

The present disclosure provides a method for controlling a secondary battery protection circuit, the secondary battery protection circuit including:

a boosting circuit configured to generate a control voltage in response to boosting a voltage across a secondary battery;

a drive circuit configured to supply the control voltage to a gate of a charge control NMOS transistor and a gate of a discharge control NMOS transistor, the charge control NMOS transistor and the discharge control NMOS transistor being electrically inserted in a current path that is between a positive electrode of the secondary battery and a high side power supply terminal for each of a load and a charger;

an overdischarge detecting circuit configured to detect the voltage across the secondary battery that is lower than a predetermined first voltage for overdischarge detection; and a control circuit configured to operate the drive circuit such that the gate of the discharge control NMOS transistor becomes at low level, upon detecting, by the overdischarge detecting circuit, that the voltage across the secondary battery is lower than the first voltage for overdischarge detection, the method comprising:

detecting the voltage across the secondary battery that is lower than a second voltage for low voltage detection, the second voltage being set to be lower than the first voltage for overdischarge detection;

interrupting a node through which the control voltage is supplied to the gate of the charge control NMOS transistor, such that the node becomes at high impedance, upon detecting that the voltage across the secondary battery is lower than the second voltage for low voltage detection; and fixing the gate of the charge control NMOS transistor at a potential at the high side power supply terminal, upon detecting that the voltage across the secondary battery is lower than the second voltage for low voltage detection.

DESCRIPTION OF THE EMBODIMENTS

Related art information relevant to the present disclosure recognized by the inventor of this application will be provided below with reference to FIG. 1.

Figure 1:
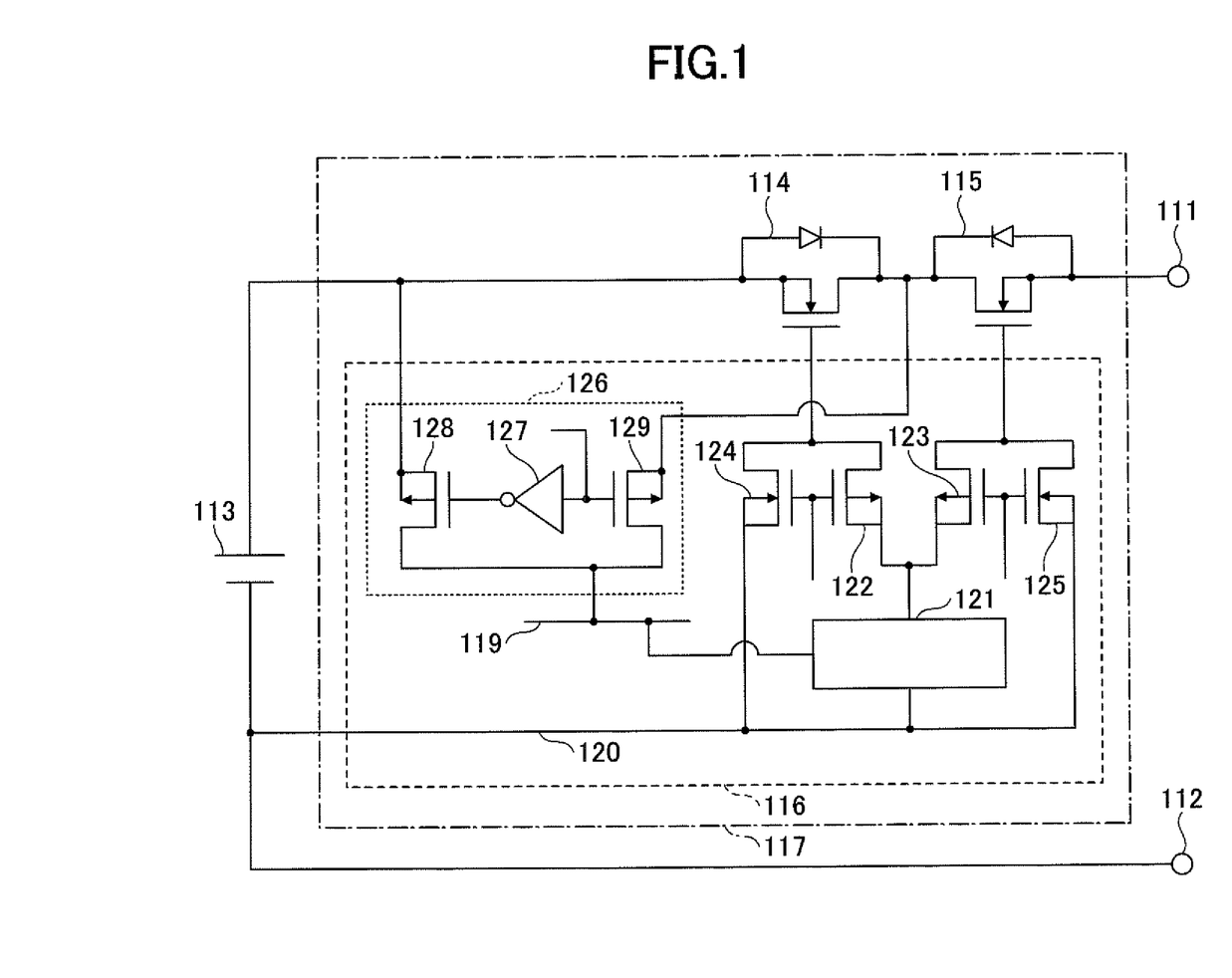
FIG. 1 is a diagram illustrating a configuration of a battery pack in related art.

FIG. 1 is a circuit diagram of a battery pack disclosed in Patent document 1. The battery pack illustrated in FIG. 1 includes a secondary battery 113; a protection circuit 117 for protecting the secondary battery 113; and terminals 111 and 112 to which a charging device and a load device not illustrated are connected. The protection circuit 117 includes n-channel MOSFETs 114 and 115, which are connected in series between a positive electrode of the secondary battery 113 and the positive terminal 111, and includes a control unit 116 that controls the MOSFETs 114 and 115.

The control unit 116 includes a charge pump 121 that boosts a voltage across a supply line 119 and a ground line 120. The control unit 116 also includes P-channel MOSFETs 122 and 123, which apply a boosting voltage from the charge pump 121 to respective gates of the MOSFETs 114 and 115, and includes N-channel MOSFETs 124 and 125 that allow respective gates of the MOSFETs 114 and 115 to be set at a potential at the ground line 120. A common gate of the MOSFETs 122 and 124 and a common gate of the MOSFETs 123 and 125 are connected to internal circuits not illustrated, in the control unit 116.

The control unit 116 further includes a power switching circuit 126. The power switching circuit 126 includes P-channel MOSFETs 128 and 129, and an inverter 127. When a given gate signal is input to the power switching circuit 126, either of the MOSFETs 128 and 129 is in an on-state, so that a voltage supply source to the supply line 119 is thereby switched between the secondary battery 113 and the positive terminal 111.

Hereafter, the operation of the battery pack illustrated in FIG. 1 will be described. When the terminals 111 and 112 of the battery pack are connected to a load device, the voltage across the secondary battery 113 that is applied to the supply line 119 via the MOSFET 128 is boosted by the charge pump 121. Because the MOSFETs 122 and 123 are in an on-state and the MOSFETs 124 and 125 are in an off-state, the MOSFETs 114 and 115 are in an on-state according to the boosted voltage, so that the secondary battery 113 is in a discharged state.

When discharge is maintained and a voltage value of the secondary battery 113 falls below a voltage for overdischarge detection, the MOSFET 115 changes to an off-state and thus discharge in the secondary battery 113 is stopped.

Thus, the secondary battery 113 is protected from overdischarge. In this case, because the MOSFET 128 is in an off-state and the MOSFET 129 is in an on-state, the voltage supplied from the secondary battery 113 to the supply line 119 is interrupted. Thereby, the charge pump 121 is in an off-state and thus the MOSFET 114 is also in an off-state.

Then, in a state in which the voltage value of the secondary battery 113 is below the voltage for overdischarge detection, when a charging device is connected to the terminals 111 and 112, the voltage supplied by the charging device is applied to the supply line 119, via the positive terminal 111; a parasitic diode of the MOSFET 115; and the MOSFET 129 of the power switching circuit 126. When the voltage is applied to the supply line 119, the voltage is boosted by the charge pump 121. According to the voltage boosted by the charge pump 121, the MOSFET 114 is in an on-state, so that the secondary battery 113 is in a charged state.

In the configuration illustrated in FIG. 1, in a state where the voltage value of the secondary battery 113 is very low relative to the voltage for overdischarge detection (e.g., in a state where the voltage value of the secondary battery 113 is close to 0 volts), the MOSFET 114 is turned off due to the charge pump 121 being stopped. In such a state, when the charging device is connected to the terminals 112 and 112, the voltage associated with the positive terminal 111 increases to an output voltage VCHG of the charging device. In this case, when a forward voltage associated with the parasitic diode of the MOSFET 115 is expressed by $Vf_{115}$, an input voltage VcpIN (voltage associated with the supply line 119) to the charge pump 121 is given by "VcpIN=VCHG−$Vf_{115}$".

When the voltage associated with the positive terminal 111 has increased up to the input voltage VcpIN meeting or exceeding a minimum operating voltage VcpL for the charge pump 121, the charge pump 121 starts. The boosting voltage by the starting charge pump 121 is supplied to the gate of the MOSFET 114 and thus the MOSFET 114 is in an on-state.

When the MOSFET 114 is in an on-state, a drain-source voltage of the MOSFET 114 is about 0 volts, so that the input voltage VcpIN drops to a voltage VB across the secondary battery 113. If "VcpIN=VB<VcpL" is set, the charge pump 121 stops again and thus the MOSFET 114 is in an off-state again. In other words, it is considered that, until VB>VcpL is set, the charge pump 121 is repeatedly started and stopped, which might result in reduction in a charge efficiency for the secondary battery 113.

In view of the point described above, the present disclosure provides a secondary battery protection circuit, a secondary battery protection apparatus, a battery pack, and a method for controlling a secondary battery protection circuit, a secondary battery protection apparatus, a battery pack and a secondary battery protection circuit whereby it is possible to avoid reduction in a charge efficiency for a secondary battery that is in a low voltage state.

Embodiments of the present disclosure will be hereinafter described with reference to the drawings.

Figure 2:
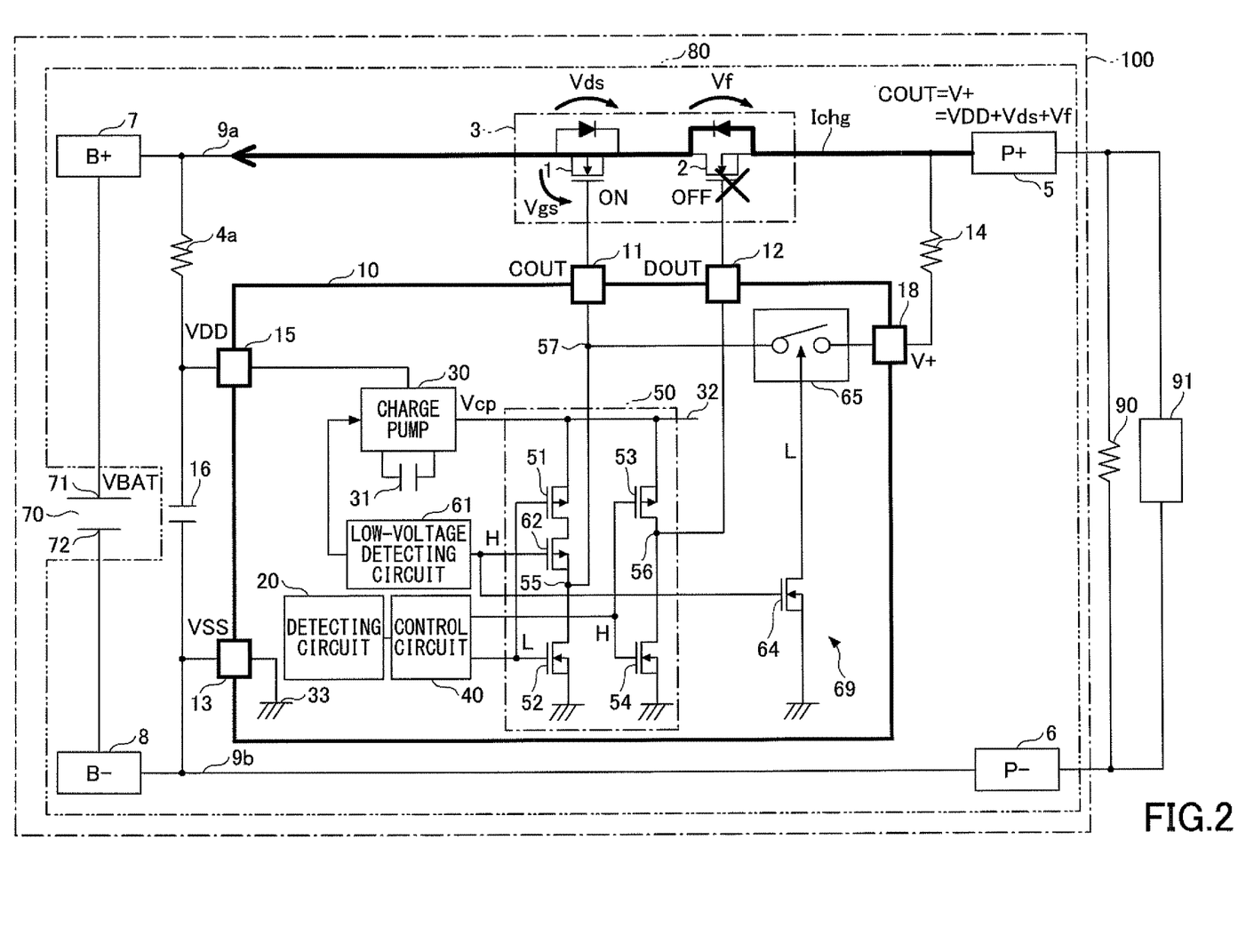
FIG. 2 is a diagram illustrating an example of a configuration of a battery pack according to one embodiment.

FIG. 2 is a diagram illustrating an example of a configuration of a battery pack according to a first embodiment. The battery pack 100 illustrated in FIG. 2 includes a secondary battery 70 and battery protection apparatus 80 that are embedded therein.

The secondary battery 70 is an example of a rechargeable battery. The secondary battery 70 supplies power to a load 90 that is connected to a positive terminal 5 (P+ terminal) and a negative terminal 6 (P− terminal). The secondary battery 70 can be charged by a charger 91 that is connected to the positive terminal 5 and the negative terminal 6. Specific examples of the secondary battery 70 include a lithium ion battery, a lithium polymer battery, and the like. The battery pack 100 may be embedded in the load 90, or be provided externally.

The load 90 is an example of a load that is powered by the secondary battery 70 of the battery pack 100, where the secondary battery 70 is used as a power source. Specific examples of the load 90 include a power device such as a power tool; and an electronic device such as a portable terminal device. Examples of the electronic device include a cellular phone; a smartphone; a computer; a game device; a television set; a camera; and the like. The load 90 is not limited to the devices described above.

The battery protection apparatus 80 is an example of a secondary battery protection apparatus that is powered by the secondary battery 70 used as a power source, for operating. By controlling the charge and discharge in the secondary battery 70, the battery protection apparatus 80 protects the secondary battery 70 from overcharge, overdischarge, and the like. The battery protection apparatus 80 includes the positive terminal 5 (P+ terminal), the negative terminal 6 (P− terminal), a positive terminal 7 (B+ terminal), a negative terminal 8 (B-terminal), a switching circuit 3, and a battery protection circuit 10.

The positive terminal 5 is an example of a terminal to which a high side power supply terminal of each of the load 90 and the charger 91 can be connected. The negative terminal 6 is an example of a terminal to which a low side power supply terminal of each of the load 90 and the charger 91 can be connected. The positive terminal 7 is a terminal for connecting a positive-side current path 9a to a positive electrode 71 of the secondary battery 70, and the negative terminal 8 is a terminal for connecting a negative-side current path 9b to a negative electrode 72 of the secondary battery 70.

The positive electrode 71 of the secondary battery 70 and the positive terminal 5 are connected via the positive-side current path 9a, and the negative electrode 72 of the secondary battery 70 and the negative terminal 6 are connected via the negative-side current path 9b. The positive-side current path 9a is an example of a charge-and-discharge current path between the positive electrode 71 of the secondary battery 70 and the positive terminal 5. The negative-side current path 9b is an example of a charge-and-discharge current path between the negative electrode 72 of the secondary battery 70 and the negative terminal 6.

The switching circuit 3 is inserted in the positive-side current path 9a, between the positive electrode 71 of the secondary battery 70 and the positive terminal 5 that can be connected to the high side power supply terminal of each of the load 90 and the charger 91.

For example, the switching circuit 3 includes a charge control transistor 1 and a discharge control transistor 2. The charge control transistor 1 is an example of a charge-path interrupting unit that interrupts a charge path associated with the secondary battery 70. The discharge control transistor 2 is an example of a discharge-path interrupting unit that interrupts a discharge path associated with the secondary battery 70. In the case of FIG. 1, the charge control transistor 1 interrupts the current path 9a along which a charge current in the secondary battery 70 flows, and the discharge control transistor 2 interrupts the current path 9a along which a discharge current in the secondary battery 70 flows. The transistors 1 and 2 are switching elements each of which switches between conduction and interruption of the current path 9a. The transistors 1 and 2 are inserted in the current path 9a. Each of the transistors 1 and 2 is an NMOS transistor, for example.

The charge control transistor 1 has input capacitance that is parasitic between a gate and a source, and has input capacitance that is parasitic between the gate and a drain. The discharge control transistor 2 has input capacitance that is parasitic between a gate and a source, and has input capacitance that is parasitic between the gate and a drain. The charge control transistor 1 has a parasitic diode that is between the drain and the source, and that conducts current in a forward direction opposite to a direction in which a charge current for the secondary battery 70 flows. The discharge control transistor 2 has a parasitic diode that is between the drain and the source, and that conducts current in a forward direction opposite to a direction in which a discharge current in the secondary battery 70 flows.

The battery protection circuit 10 is an example of a secondary battery protection circuit. The battery protection circuit 10 protects the secondary battery 70 from overdischarge and the like, by using a pair of NMOS transistors that are inserted in the current path 9a being between the positive electrode 71 of the secondary battery 70 and the positive terminal 5 that is connected to the high side power terminal of each of the load 90 and the charger 91. By turning off the switching circuit 3, the battery protection circuit 10 performs an operation to protect the secondary battery 70. The battery protection circuit 10 is an integrated circuit (IC) that operates according to a battery voltage (also referred to as a "cell voltage") across the positive electrode 71 and the negative electrode 72 of the secondary battery 70. For example, the battery protection circuit 10 includes a charge control terminal 11 (COUT terminal); a discharge control terminal 12 (DOUT terminal); a monitor terminal 18 (V+ terminal); a power supply terminal 15 (VDD terminal); and a ground terminal 13 (VSS terminal).

The COUT terminal is connected to the gate of the charge control transistor 1, and outputs a signal to turn on or off the charge control transistor 1. The DOUT terminal is connected to the gate of the discharge control transistor 2, and outputs a signal to turn on or off the discharge control transistor 2.

The V+ terminal is used to monitor a potential at the positive terminal 5 and is connected to the positive terminal 5. For example, the V+ terminal is used by the control circuit 40 to monitor the presence or absence of the load 90, or the presence or absence of connection of the charger 91, and is connected to the positive-side current path 9a via the resistor 14, between either of the transistor 1 or the transistor 2 and the positive terminal 5.

The VDD terminal is a power supply terminal of the battery protection circuit 10 and is connected to the positive electrode 71 of the secondary battery 70 via the positive-side current path 9a. The VSS terminal is a ground terminal of the battery protection circuit 10 and is connected to the negative electrode 72 of the secondary battery 70 via the negative-side current path 9b. A series circuit of a resistor 4a and a capacitor 16 is connected between the positive-side current path 9a and the negative-side current path 9b, so as to be connected to the secondary battery 70 in parallel. The VDD terminal is connected to a connection node between the resistor 4a and the capacitor 16, so that variation in the potential at the VDD terminal can be thereby suppressed.

The battery protection circuit 10 turns off the charge control transistor 1 to protect the secondary battery 70 from a charge abnormality such as overcharge. The battery protection circuit 10 turns off the discharge control transistor 2 to protect the secondary battery 70 from a discharge abnormality such as overdischarge; or a shorting abnormality. The battery protection circuit 10 is an integrated circuit (IC) that includes a detecting circuit 20; a charge pump 30; a drive circuit 50; a control circuit 40; a low-voltage detecting circuit 61; an interrupt circuit 62; and a switching circuit 69.

The detecting circuit 20 detects a state of the secondary battery 70 and outputs a detected state. The detecting circuit 20 monitors a power supply voltage Vd, which is a voltage across the VDD terminal and the VSS terminal. The VDD terminal is connected to the positive electrode 71 of the secondary battery 70, and the VSS terminal is connected to the negative electrode 72 of the secondary battery 70. In such a manner, the power supply voltage Vd is approximately equal to a cell voltage VBAT across the secondary battery 70. Thus, the detecting circuit 20 can detect the cell voltage VBAT across the secondary battery 70, in response to monitoring the power supply voltage Vd. The detecting circuit 20 also monitors a monitored voltage V+, which is a voltage associated with the V+ terminal, where a potential at the VDD terminal is used as a reference potential.

For example, when the power supply voltage Vd that is higher than a predetermined voltage Vdet1 for overcharge detection is detected, the detecting circuit 20 outputs an overcharge-detection signal indicating that the power supply voltage Vd is detected to be higher than the predetermined voltage Vdet1 for overcharge detection. Further, for example, when the power supply voltage Vd that is lower than a predetermined overcharge-return voltage Vrel1 is detected, the detecting circuit 20 outputs an overcharge-return detection signal indicating that the power supply voltage Vd is detected to be lower than the overcharge-return voltage Vrel1. The voltage Vdet1 for overcharge detection is a threshold used to determine whether overcharge is detected, and the overcharge-return voltage Vrel1 is a threshold used to determine whether to return to a normal state. The overcharge-return voltage Vrel1 is set to a voltage value that is lower than the voltage Vdet1 for overcharge detection.

For example, when the power supply voltage Vd that is lower than a predetermined voltage Vdet2 for overdischarge detection is detected, the detecting circuit 20 outputs an overdischarge-detection signal indicating that the power supply voltage Vd is detected to be lower than the predetermined voltage Vdet2 for overdischarge detection. Further, for example, when the power supply voltage Vd that is higher than a predetermined overdischarge-return voltage Vrel2 is detected, the detecting circuit 20 outputs an overdischarge-return detection signal indicating that the power supply voltage Vd is detected to be higher than the overdischarge-return voltage Vrel2. The voltage Vdet2 for overdischarge detection is a threshold used to determine whether overdischarge is detected, and the overdischarge-return voltage Vrel2 is a threshold used to determine whether to return to a normal state. The overdischarge-return voltage Vrel2 is set to a voltage value that is higher than the voltage Vdet2 for overdischarge detection.

For example, when the monitor voltage V+ that is lower than a predetermined voltage Vdet3 for discharge-overcurrent detection is detected, the detecting circuit 20 outputs a discharge-overcurrent detection signal indicating that the monitor voltage V+ is detected to be lower than the voltage Vdet3 for discharge-overcurrent detection. Further, for example, when a monitor voltage V+ that is higher than a predetermined discharge-overcurrent return voltage Vrel3 is detected, the detecting circuit 20 outputs a discharge-overcurrent return detection signal indicating that the monitor voltage V+ is detected to be higher than the discharge-overcurrent return voltage Vrel3. The voltage Vdet3 for discharge-overcurrent detection is a threshold used to determine whether discharge-overcurrent is detected, and the discharge-overcurrent return voltage Vrel3 is a threshold used to determine whether to return to a normal state. The discharge-overcurrent return voltage Vrel3 is set to a voltage value that is higher than the voltage Vdet3 for discharge overcurrent detection.

For example, when the monitor voltage V+ that is higher than a predetermined voltage Vdet4 for charge-overcurrent detection is detected, the detecting circuit 20 outputs a charge-overcurrent detection signal indicating that the monitor voltage V+ is detected to be higher than the voltage Vdet4 for charge-overcurrent detection. Further, for example, when the monitor voltage V+ that is lower than a predetermined charge-overcurrent return voltage Vrel4 is detected, the detecting circuit 20 outputs a charge-overcurrent return detection signal indicating that the monitor voltage V+ is detected to be lower than the charge-overcurrent return voltage Vrel4. The voltage Vdet4 for charge-overcurrent detection is a threshold used to determine whether charge-overcurrent is detected, and the charge-overcurrent return voltage Vrel4 is a threshold used to determine whether to return to a normal state. The charge-overcurrent return voltage Vrel4 is set to a voltage value that is lower than the voltage Vdet4 for charge-overcurrent detection.

The charge pump 30 is a boosting circuit that generates, in response to boosting the power supply voltage Vd, a control voltage Vcp having a voltage value that is greater than the power supply voltage Vd. For example, the charge pump 30 generates the control voltage Vcp that is boosted based on input capacitance of either of the charge control transistor 1 or the discharge control transistor 2, the input capacitance being used as output capacitance of the charge pump 30. The charge pump 30 may be a circuit that boosts a voltage by other known configurations. For example, the charge pump 30 repeatedly transfers a charge stored by a flying capacitor 31 that is charged according to the power supply voltage Vd, to the input capacity of either of the charge control transistor 1 or the discharge control transistor 2, to thereby generate the control voltage Vcp having double the magnitude of the power supply voltage Vd. The flying capacitor 31 may be embedded in the battery protection circuit 10, or be provided externally.

The drive circuit 50 supplies the control voltage Vcp to the gate of the charge control transistor 1 or the gate of the discharge control transistor 2.

In accordance with the control voltage Vcp, the drive circuit 50 outputs, from the COUT terminal, a signal to turn on the charge control transistor 1. In other words, the drive circuit 50 supplies the control voltage Vcp to the COUT terminal so that the output state of the COUT terminal is high level. In contrast, the drive circuit 50 outputs, from the DOUT terminal, a signal to turn on the discharge control transistor 2. In other words, the drive circuit 50 supplies the control voltage Vcp to the DOUT terminal so that the output state of the DOUT terminal is high level.

In accordance with a ground potential at the VSS terminal or a power supply potential at the VDD terminal, the drive circuit 50 outputs, from the COUT terminal, a signal to turn off the charge control transistor 1. In other words, the drive circuit 50 supplies the ground potential at the VSS terminal or the power supply potential at the VDD terminal, to the COUT terminal, so that the output state of the COUT terminal is low level. In contrast, in accordance with the ground potential at the VSS terminal or the potential at the V+ terminal, the drive circuit 50 outputs, from the DOUT terminal, a signal to turn off the discharge control transistor 2. In other words, the drive circuit 50 supplies the ground potential at the VSS terminal or the potential at the V+ terminal, to the DOUT terminal, so that the output state of the DOUT terminal is low level.

For example, the drive circuit 50 includes a charge control-side drive circuit having a CMOS (Complementary MOS) inverter structure, in which a P-channel drive switch 51 whose source is connected to a high electric potential part 32 (an output node of the charge pump 30); and an N-channel drive switch 52 whose source is connected to a low electric potential part 33 (a ground of the charge pump 30) are connected in series. The drive switch 51 is a PMOS transistor, and the drive switch 52 is an NMOS transistor. The high electric potential part 32 is a conductive part connected to the output of the charge pump 30 and outputs the control voltage Vcp that is generated by the charge pump 30. The low electric potential part 33 is a conductive part where, in a state where overcharge in the secondary battery 70 is not detected, a potential is lower than the high electric potential part 32. In the example illustrated in FIG. 2, the low electric potential part 33 is connected to the VSS terminal. Further, in the example illustrated in FIG. 2, a connection node (an output node 55 of the CMOS inverter of the charge control side) between the interrupt circuit 62 and the drive switch 52 is connected to the COUT terminal.

For example, the drive circuit 50 includes a discharge control-side drive circuit having a CMOS inverter structure, in which a P-channel drive switch 53 whose source is connected to the high electric potential part 32; and an N-channel drive switch 54 whose source is connected to the low electric potential part 33 are connected in series. The drive switch 53 is a PMOS transistor, and the drive switch 54 is an NMOS transistor. A connection node (an output node 56 of the CMOS inverter of the discharge control side) between the drive switch 53 and the drive switch 54 is connected to the DOUT terminal.

When overcharge or charge-overcurrent in the secondary battery 70 is detected by the detecting circuit 20, after a predetermined delay time elapses, the control circuit 40 operates the drive circuit 50 such that an output state of the COUT terminal changes from high level to low level. When the output state of the COUT terminal changes to the low level, the charge control transistor 1 is turned off, so that the current conducting in a direction in which the secondary battery 70 is charged is prevented from flowing along the current path 9a. Thereby, the charge in the secondary battery 70 is stopped and thus the secondary battery 70 can be protected from overcharge or charge-overcurrent.

For example, when the power supply voltage Vd that is higher than a predetermined voltage Vdet1 for overcharge detection is not detected, the control circuit 40 outputs a low level signal L to the gate of each of the drive switches 51 and 52. Thereby, the drive switch 51 is turned on and the drive switch 52 is turned off, so that the output state of the COUT terminal is high level when the interrupt circuit 62 is turned on by the low-voltage detecting circuit 61. In contrast, when the power supply voltage Vd that is higher than the voltage Vdet1 for overcharge detection is detected, the control circuit 40 determines whether a predetermined overcharge-detection delay time tVdet1 has elapsed after the power supply voltage Vd is detected by the detecting circuit 20. Before the overcharge-detection delay time tVdet1 elapses, when the power supply voltage Vd that is higher than the voltage Vdet1 for overcharge detection is continuously detected by the detecting circuit 20, the control circuit 40 outputs a high level signal to the gate of each of the drive switches 51 and 52. Thereby, the drive switch 51 is turned off and the drive switch 52 is turned on, so that the output state of the COUT terminal is low level.

When overdischarge or discharge-overcurrent in the secondary battery 70 is detected by the detecting circuit 20, after a predetermined delay time elapses, the control circuit 40 operates the drive circuit 50 such that the output state of the DOUT terminal changes from high level to low level. When the output state of the DOUT terminal changes to the low level, the discharge control transistor 2 is turned off, so that the current conducting in a direction in which the secondary battery 70 is discharged is prevented from flowing in the current path 9a. Thereby, the discharge in the secondary battery 70 is stopped and thus the secondary battery 70 can be protected from overdischarge or discharge-overcurrent.

For example, when the power supply voltage Vd ($\approx$ the cell voltage VBAT) that is lower than a predetermined voltage Vdet2 for overdischarge detection is not detected by the detecting circuit 20, the control circuit 40 outputs a low level signal to the gate of each of the drive switches 53 and 54. Thereby, the drive switch 53 is turned on and the drive switch 54 is turned off, so that the output state of the DOUT terminal is high level. In contrast, when the power supply voltage Vd ($\approx$ the cell voltage VBAT) that is lower than a predetermined voltage Vdet2 for overdischarge detection is detected by the detecting circuit 20, the control circuit 40 determines whether a predetermined overdischarge-detection delay time tVdet2 has elapsed after the power supply voltage Vd is detected by the detecting circuit 20. Before the overdischarge-detection delay time tVdet2 elapses, when the power supply voltage Vd that is lower than the voltage Vdet2 for overdischarge detection is continuously detected by the detecting circuit 20, the control circuit 40 outputs a high level signal H to the gate of each of the drive switches 53 and 54. Thereby, the drive switch 53 is turned off and the drive switch 54 is turned on, so that the output state of the DOUT terminal is low level.

Then, when the power supply voltage Vd ($\approx$ the cell voltage VBAT) that is higher than a predetermined overdischarge-return voltage Vrel2 is detected by the detecting circuit 20, the control circuit 40 determines whether a predetermined overdischarge-return delay time tVrel2 has elapsed after the power supply voltage Vd is detected by the detecting circuit 20. Before the overdischarge-return delay time tVrel2 elapses, when the power supply voltage Vd that is higher than the overdischarge-return voltage Vrel2 is continuously detected by the detecting circuit 20, the control circuit 40 outputs a low level signal to the gate of each of the drive switches 53 and 54. Thereby, the drive switch 53 is turned on and the drive switch 54 is turned off, so that the output state of the DOUT terminal is high level. With the output state of the DOUT terminal becoming the high level, the discharge control transistor 2 switches from off to on, so that the discharge interruption in the secondary battery 70 is canceled.

For example, the control circuit 40 includes multiple analog logic circuits, without using a CPU (Central Processing Unit).

The low-voltage detecting circuit 61 detects the power supply voltage Vd that is lower than a voltage Vst for low voltage detection, which is set to be lower than the voltage Vdet2 for overdischarge detection. The voltage Vst for low voltage detection is a threshold used to determine whether a low voltage is detected, and is set to be higher than a minimum operating voltage VcpL that is set at the charge pump 30. When the power supply voltage Vd that is lower than the voltage Vst for low voltage detection is not detected, the low-voltage detecting circuit 61 outputs a low level signal. Thereby, the interrupt circuit 62 is turned on and the drive switch 64 and a switch 65 of the switching circuit 69 are turned off. In contrast, when the power supply voltage Vd that is lower than the voltage Vst for low voltage detection is detected, the low-voltage detecting circuit 61 outputs a high level signal H. Thereby, the interrupt circuit 62 is turned off and the drive switch 64 and the switch 65 of the switching circuit 69 are turned on.

When the power supply voltage Vd that is lower than the voltage Vst for low voltage detection is detected by the low-voltage detecting circuit 61, the interrupt circuit 62 interrupts a node through which the control voltage Vcp is supplied to the gate of the charge control transistor 1, so that the node becomes at high impedance.

Hereafter, as examples of the interrupt manner by the interrupt circuit 62, a first interrupt manner and a second interrupt manner will be described.

In the first interrupt manner, in a state where the voltage across the secondary battery 70 is lower than the voltage Vst for low voltage detection, the control circuit 40 outputs a low level signal L to the gate of each of the drive switch 51 and the drive switch 52. For example, when the power supply voltage Vd is not detected to be higher than a predetermined voltage Vdet1 for overcharge detection (e.g., in a state where the voltage across the secondary battery 70 is lower than the voltage Vst for low voltage detection), the control circuit 40 outputs a low level signal L to the gate of each of the drive switches 51 and 52.

In the first interrupt manner, the interrupt circuit 62 interrupts a high side path between the output node 55 of the CMOS inverter and the high electric potential part 32. In FIG. 2, a circuit configuration in which the interrupt circuit 62 includes a switching element that is a PMOS transistor and that interrupts the high side path, and in which the switch element is inserted between the output node 55 and a drain of the drive switch 51 is illustrated. Note that the switching element may be inserted between the source of the drive switch 51 and the high electric potential part 32.

In the first interrupt manner, in the state where the voltage across the secondary battery 70 is lower than the voltage Vst for low voltage detection, the drive switch 51 is in an on-state and the drive switch 52 is in an off-state, because the low level signal L is input to the gate of each of the drive switches 51 and 52. Accordingly, in the first interrupt manner, the drive switch 51 in the on-state is disconnected from the output node 55, by the high side interrupt circuit 62, so that the charge control-side drive circuit of the drive circuit 50 can be disconnected from the gate of the charge control transistor 1 and the COUT terminal. In other words, the interrupt circuit 62 interrupts a path between the output node 55 and the high electric potential part 32, thereby allowing the output node 55 to provide a high impedance.

In the second interrupt manner, in a state where the voltage across the secondary battery 70 is lower than the voltage Vst for low voltage detection, the control circuit 40 outputs a high level signal to the gate of each of the drive switch 51 and the drive switch 52. For example, when the power supply voltage Vd that is lower than the voltage Vst for low voltage detection is detected by the low-voltage detecting circuit 61 (e.g., in the state where the voltage across the secondary battery 70 is lower than the voltage Vst for low voltage detection), the control circuit. 40 outputs a high level signal to the gate of each of the drive switches 51 and 52.

In the second interrupt manner, although it is not illustrated in FIG. 2, the interrupt circuit 62 interrupts a low side path between the output node 55 of the CMOS inverter and the low electric potential part 33. For example, the interrupt circuit 62 includes a switching element that interrupts the low side path, and the switching element is inserted between the output node 55 and a drain of the drive switch 52. Note that the switching element may be inserted between the source of the drive switch 52 and the low electric potential part 33.

In the second interrupt manner, in the state where the voltage across the secondary battery 70 is lower than the voltage Vst for low voltage detection, the drive switch 51 is in an off-state and the drive switch 52 is in an on-state, because the high level signal is input to the gate of each of the drive switches 51 and 52. Accordingly, in the second interrupt manner, the drive switch 52 in the on-state is disconnected from the output node 55 by the low side interrupt circuit 62 not illustrated, so that the charge control-side drive circuit of the drive circuit 50 can be disconnected from the gate of the charge control transistor 1 and the COUT terminal. In other words, the interrupt circuit 62 interrupts a path between the output node 55 and the low electric potential part 33, thereby allowing the output node 55 to provide a high impedance.

When the power supply voltage Vd that is lower than the voltage Vst for low voltage detection is detected by the low-voltage detecting circuit 61, the switching circuit 69 causes the gate of the charge control transistor 1 to be fixed at a potential at the high side power supply terminal of the charger 91. For example, when the power supply voltage Vd that is lower than the voltage Vst for low-voltage detection is detected by the low-voltage detecting circuit 61, the switching circuit 69 causes a connection between the COUT terminal and the V+ terminal. When the power supply voltage Vd that is lower than the voltage Vst for low voltage detection is not detected by the low-voltage detecting circuit 61, the switching circuit 69 interrupts the connection between the COUT terminal and the V+ terminal.

The switching circuit 69 includes, for example, the drive switch 64 and the switch 65. The drive switch 64 is an NMOS transistor, and the switch 65 is a PMOS transistor. When the drive switch 64 is turned on, the low level signal L is input to the gate of the switch 65, so that the switch 65 is thereby turned on. A connection node 57 is a node through which the COUT terminal and the switch 65 are connected.

Hereafter, the function of the low-voltage detecting circuit 61 and the switching circuit 69 will be described in more detail.

When the power supply voltage Vd is higher than the voltage Vst for low voltage detection, the switch 65 is turned off and the charge pump 30 performs boosting operation. In the boosting operation of the charge pump 30, the charge control transistor 1 is turned on, because the control voltage Vcp having double the magnitude of the power supply voltage Vd is supplied to the COUT terminal. Accordingly, when the charger 91 is connected, it is possible to charge the secondary battery 70.

Figure 3:
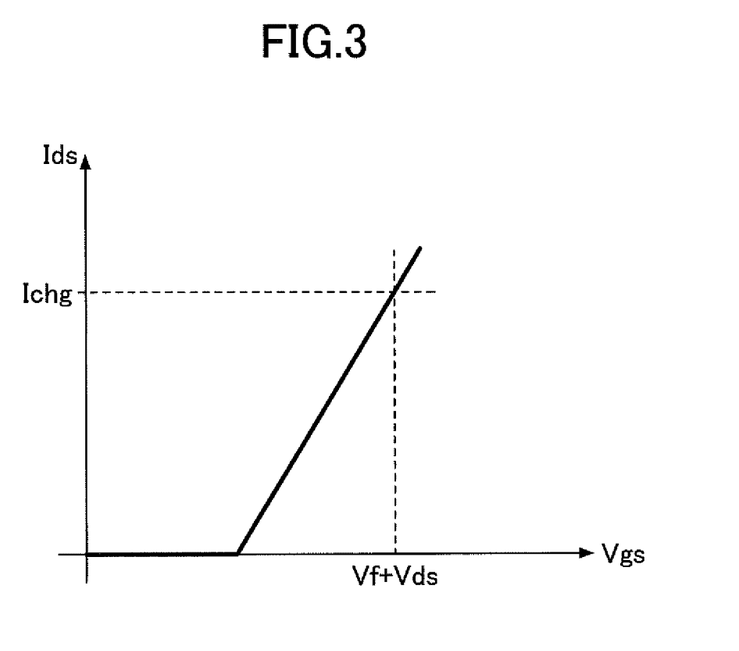
FIG. 3 is a graph illustrating an example of a change in a discharge current.

In contrast, when the power supply voltage Vd is lower than the voltage Vst for low voltage detection, the switch 65 is turned on by the low-voltage detecting circuit 61. Thereby, the potential at the COUT terminal corresponds to the potential at the P+ terminal, because the discharge control transistor 2 is turned off. In such a state, when the charger 91 is connected, the voltage associated with the P+ terminal increases to a voltage expressed by (VDD+Vf+Vds), and the voltage Vds across the drain and the source of the charge control transistor 1 is set such that a charge current Ichg flows, as illustrated in FIG. 3. In FIG. 3, the vertical axis represents the current Ids that flows between the drain and the source of the charge control transistor 1, and the horizontal axis represents the voltage Vgs across the gate and the source of the charge control transistor 1. Where, Vf indicates a forward voltage across a parasitic diode of the discharge control transistor 2, and VDD indicates the power supply voltage Vd.

As described above, the switch 65 is turned on, so that the charge control transistor 1 can be continuously in an on-state according to the output voltage of the charger 91. Thereby, unlike the case of the related art, the charge control transistor 1 can avoid switching on and off repeatedly. Accordingly, the reduction in a charge efficiency for the secondary battery that is in the low voltage state can be avoided.

In the present embodiment, when the supply voltage Vd that is lower than the voltage Vst for low voltage detection is detected by the low-voltage detecting circuit 61, the drive circuit 50 preferably shuts off a path of supplying the control voltage Vcp to the COUT terminal, through the interrupt circuit 62 that switches off. Thereby, the COUT terminal can be disconnected from the drive circuit 50 and thus instability of the potential at the COUT terminal is avoided. Accordingly, the potential at the COUT terminal can reliably correspond to the potential at the P+ terminal.

Further, when the supply voltage Vd that is lower than the voltage Vst for low voltage detection is detected, the low-voltage detecting circuit 61 preferably stops the charge pump 30. Thereby, generation of the control voltage Vcp is stopped and thus an error in the operation of the charge pump 30 can be avoided in the low voltage state.

Figure 4:
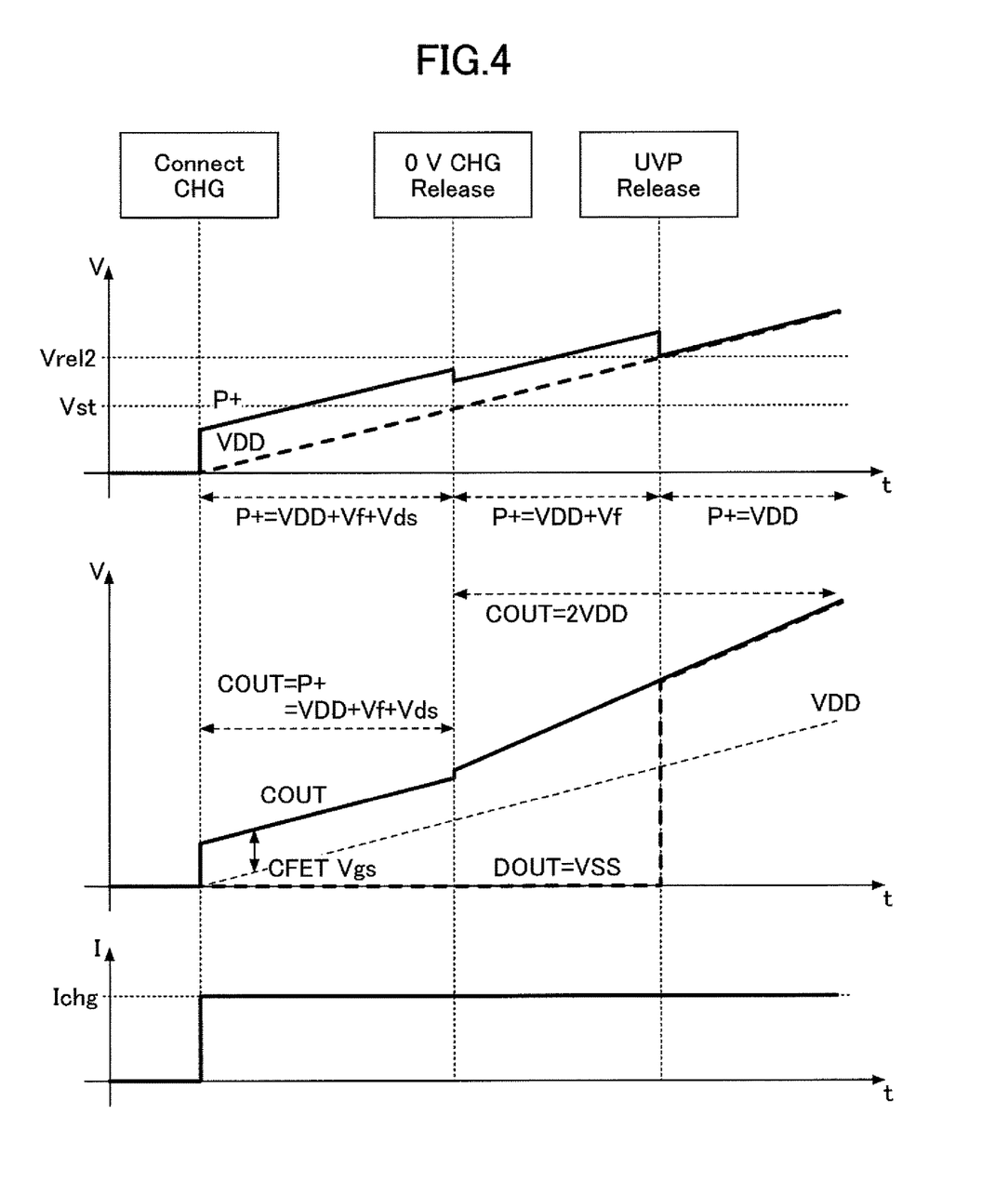
FIG. 4 is a timing chart illustrating an example of the operation of the battery pack according to one embodiment.

FIG. 4 is a timing chart illustrating an example of the operation of the battery pack according to one embodiment. When the power supply voltage Vd is lower than the voltage Vst for low voltage detection, the potential at the COUT terminal corresponds to the potential at the P+ terminal, because the switch 65 is in an on-state and the discharge control transistor 2 is in an off-state. In such a state, when the charger 91 is connected (Connect CHG), the voltage associated with each of the P+ terminal and the COUT terminal increases to a voltage expressed by (VDD+Vf+Vds), and the secondary battery 70 is charged according to the charge current. Ichg. The charge current Ichg flows through the parasitic diode of the discharge control transistor 2, as well as the charge control transistor 1 that is in an on-state.

When the power supply voltage Vd is higher than the voltage Vst for low voltage detection (0V CHG Release), the low-voltage detecting circuit 61 restarts the boosting operation of the charge pump 30, turns on the interrupt circuit 62, and turns off the switch 65. Thereby, a boosted control voltage Vcp (=2×VDD) is supplied to the COUT terminal and thus the voltage associated with the P+ terminal is expressed by VDD+Vf.

When the power supply voltage Vd is higher than the overdischarge-return voltage Vrel2 (UVP Release), the control circuit 40 operates the drive circuit 50 so that the DOUT terminal is high level. Thereby, the discharge control transistor 2 is turned on, so that the voltage associated with the P+ terminal corresponds to the power supply voltage Vd associated with the VDD terminal.

Figure 5:
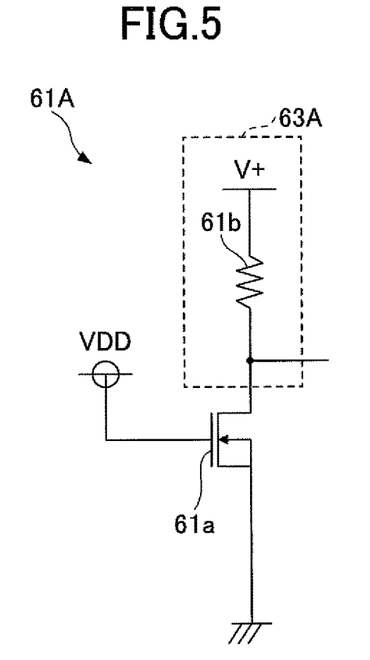
FIG. 5 is a diagram illustrating an example of a first configuration of a low-voltage detecting circuit.

FIG. 5 is a diagram illustrating an example of a first configuration of the low-voltage detecting circuit. The low-voltage detecting circuit 61A illustrated in FIG. 5 includes a serial circuit of an NMOS transistor 61a and a resistor 61b and outputs a signal from the midpoint of the serial circuit. For the NMOS transistor 61a, a gate is connected to the VDD terminal, a source is grounded, and a drain is connected to one end of the resistor 61b. The other end of the resistor 61b is connected to the V+ terminal. In the low-voltage detecting circuit 61A, the voltage Vst for low voltage detection is set based on a threshold voltage associated with the NMOS transistor 61a. The low-voltage detecting circuit 61A includes a level shift circuit 63A that adjusts a potential level of an output signal of the low-voltage detecting circuit 61A, to a potential level of the high side power supply terminal (a potential level of the V+ terminal) of the charger 91. The level shift circuit 63A includes the resistor 61b that is inserted between an output node of the low-voltage detecting circuit 61A and the V+ terminal, and performs level shifting by the resistor 61b.

Figure 6:
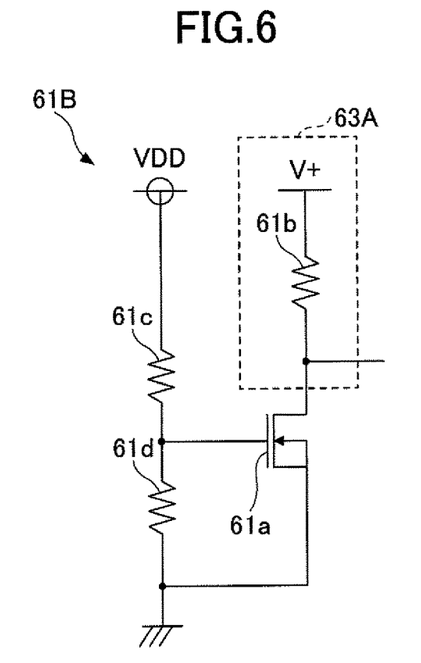
FIG. 6 is a diagram illustrating an example of a second configuration of the low-voltage detecting circuit.

FIG. 6 is a diagram illustrating an example of a second configuration of the low-voltage detecting circuit. The low-voltage detecting circuit 61B illustrated in FIG. 6 has a configuration of changing the voltage Vst for low voltage detection, by a resistance ratio of resistors 61c and 61d. A voltage obtained by dividing the power supply voltage Vd due to the resistors 61c and 61d is supplied to the gate of the NMOS transistor 61a. The low-voltage detecting circuit 61B includes the level shift circuit 63A that has the same configuration as that in FIG. 5.

Figure 7:
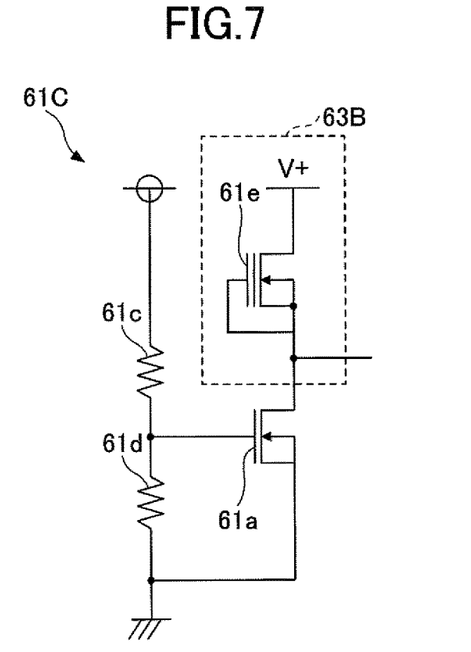
FIG. 7 is a diagram illustrating an example of a third configuration of the low-voltage detecting circuit.

FIG. 7 is a diagram illustrating an example of a third configuration of the low-voltage detecting circuit. The low-voltage detecting circuit 61C illustrated in FIG. 7 includes the depletion-type NMOS transistor 61e, instead of the resistor 61b in FIG. 6. The depletion-type NMOS transistor 61e serves as a current source. The low-voltage detecting circuit 61C includes a level shift circuit 63B that adjusts a potential level of the output signal of the low-voltage detecting circuit 61C, to a potential level of the high side power supply terminal (a potential level of the V+ terminal) of the charger 91. The level shift circuit 63B includes a depletion-type NMOS transistor 61e that is connected between an output node of the low-voltage detecting circuit 61C and the V+ terminal, and performs level shifting by the NMOS transistor 61e.

Figure 8:
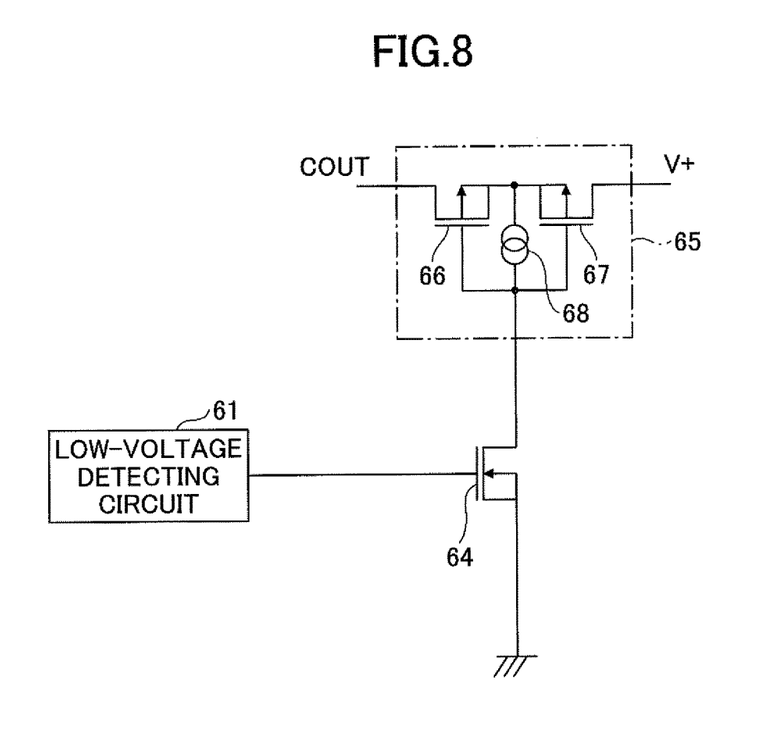
FIG. 8 is a diagram illustrating an example of a switch configuration.

FIG. 8 is a diagram illustrating an example of a switch configuration. The switch 65 illustrated in FIG. 8 includes a serial circuit of PMOS transistors 66 and 67 and includes a current source 68 that is connected between a connection midpoint of the PMOS transistors 66 and 67 and a common connection gate. With such a structure, a reverse current flow can be avoided between the COUT terminal and the V+ terminal.

A drive switch 64 is an NMOS transistor whose gate is controlled according to the output of the level shift circuit described above. For the PMOS transistors 66 and 67, respective gates that are controlled by the drive switch 64 are commonly connected and respective sources are commonly connected. A drain of the PMOS transistor 66 is connected to the COUT terminal, and a drain of the PMOS transistor 67 is connected to the V+ terminal. The current source 68 is connected between the common connection gate and a common connection source, with respect to the PMOS transistors 66 and 67.

Figure 9:
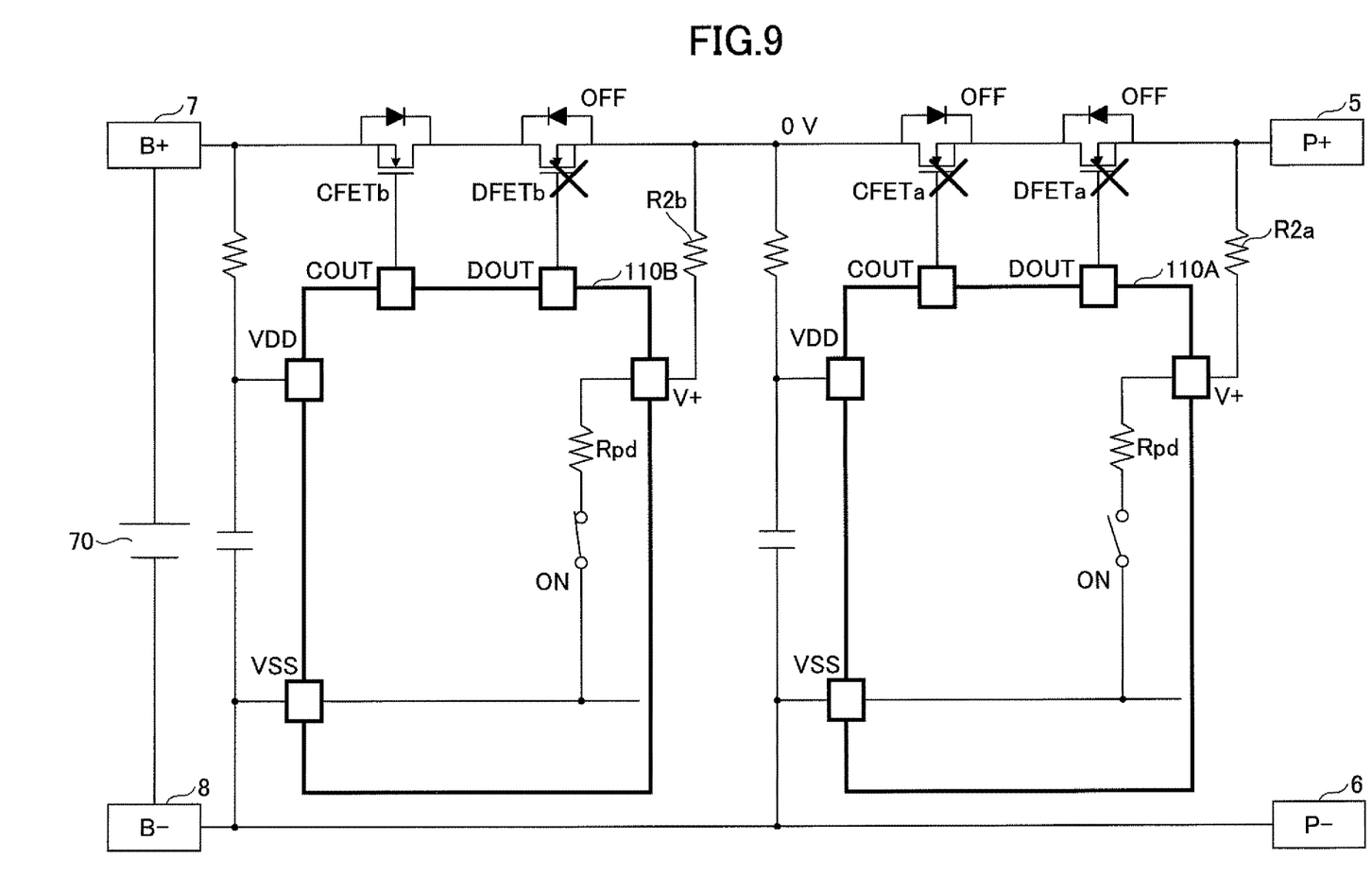
FIG. 9 is a diagram illustrating a configuration of a battery pack according to a comparative embodiment.

FIG. 9 is a diagram illustrating a configuration of a battery pack according to one comparative embodiment. In order to enhance safety of the battery pack, a dual protection configuration in which a first battery protection circuit 110A and a second battery protection circuit 110B are connected in series is taken. The first battery protection circuit 110A and the second battery protection circuit 110B each detect overdischarge independently. When the first battery protection circuit 110A detects overdischarge, the first battery protection circuit 110A turns off a discharge control transistor DFETa, so that a V+ terminal of the first battery protection circuit 110A becomes connected to a VSS terminal via a resistor Rpd and a switch. When the second battery protection circuit 110B detects overdischarge, the second battery protection circuit 110B turns off a discharge control transistor DFETb, so that a V+ terminal of the second battery protection circuit 110B becomes connected to a VSS terminal via a resistor Rpd and a switch.

However, when the second battery protection circuit 110B detects overdischarge and turns off the discharge control transistor DFETb, discharge is not allowed, so that a power supply voltage across a VDD terminal and the VSS terminal of the first battery protection circuit 110A becomes 0 V. In this case, when the first battery protection circuit 110A detects a low voltage state (0 volts) of the power supply voltage and turns off a charge control transistor CFETa, charge and discharge in the battery pack are not allowed. As a result, even when a charger is connected, the battery cannot be recharged and thus the battery pack is disabled.

Figure 10:
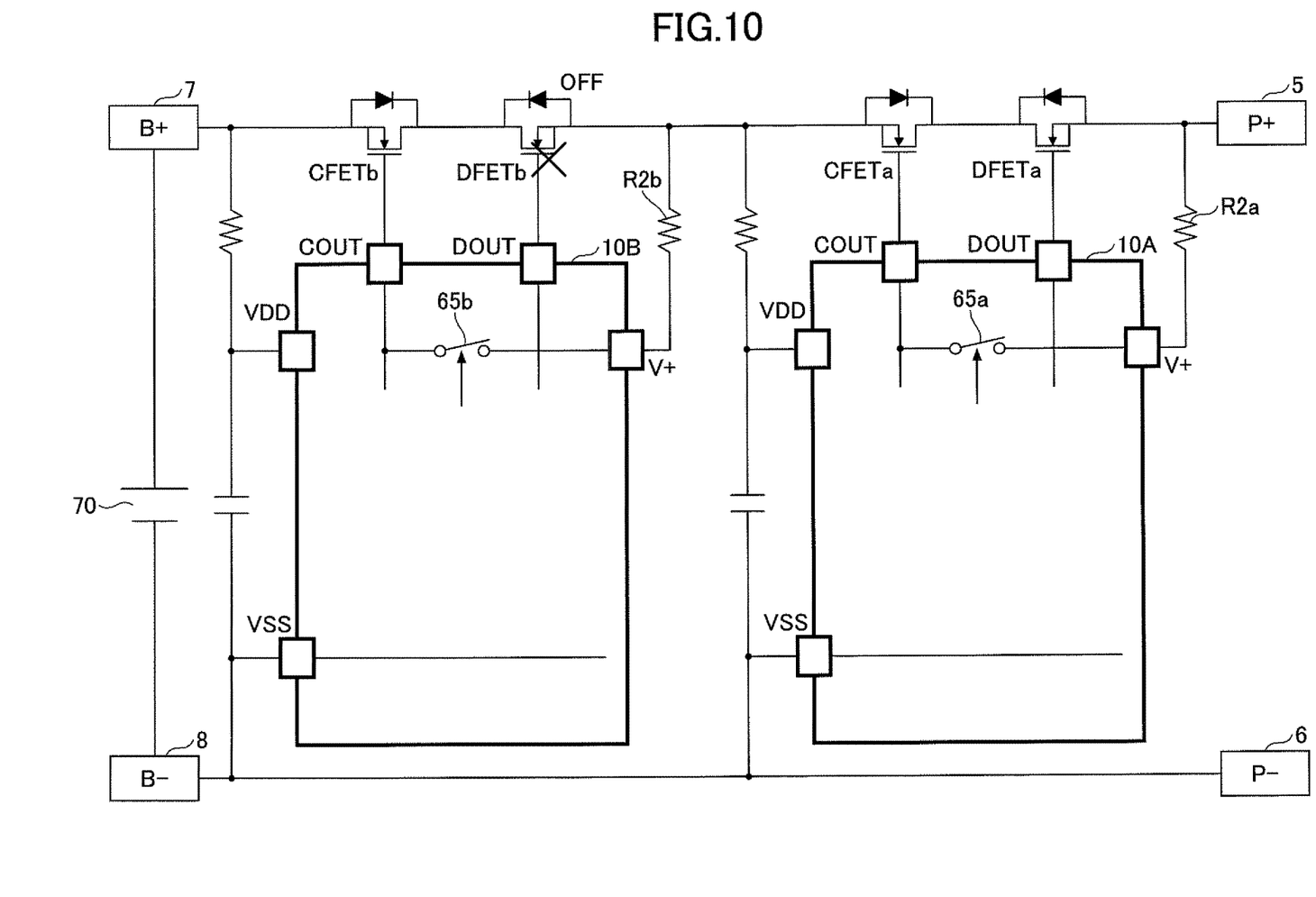
FIG. 10 is a diagram illustrating an example of a battery pack according to a second embodiment.

In contrast, FIG. 10 is a diagram illustrating a configuration of a battery pack according to a second embodiment. Each of a first battery protection circuit 10A and a second battery protection circuit. 10B has the same configuration as the battery protection circuit 10 (FIG. 2) described above. Each of switches 65a and 65b illustrated in FIG. 10 corresponds to the switch 65 described above.

In the configuration in FIG. 10, the second battery protection circuit 10B detects overdischarge to turn off a discharge control transistor DFETb. Further, the second battery protection circuit 10B detects a low voltage state to turn on the switch 65b. Thereby, when a charger is connected between a P+ terminal and a P– terminal, a voltage across the charger can be applied to a gate of a charge control transistor CFETb. Thereby, a charge current that is output from the charger flows into the secondary battery 70 via a discharge control transistor DFETa in an on-state; a charge control transistor CFETa in an on-state; a parasitic diode of the discharge control transistor DFETb in an off-state; and the charge control transistor CFETb in an on-state. In such a manner, the battery pack can be prevented from being disabled. In the present embodiment, when malfunction of the second battery protection circuit 10B is detected, the first battery protection circuit 10A operates in the same manner as the second battery protection circuit 10B. Thereby, the battery pack can be reliably used.

The secondary battery protection circuit, the secondary battery protection apparatus, and the battery pack have been described according to the embodiments. However, the present disclosure is not limited to the above embodiments. Various modifications and modifications, such as combinations of some or all of the different embodiments, or substitutions therewith, can be made within a scope of the present disclosure.

For example, the charge control transistor 1 and the discharge control transistor 2 may be disposed to replace each other with respect to location in the drawing.

What is claimed is:

1. A secondary battery protection circuit for protecting a secondary battery, comprising:
   a boosting circuit configured to generate a control voltage in response to boosting a voltage across a secondary battery;
   a drive circuit configured to supply the control voltage to a gate of a charge control NMOS transistor and a gate of a discharge control NMOS transistor, the charge control NMOS transistor and the discharge control NMOS transistor being configured to be electrically inserted in a current path that is between a positive electrode of the secondary battery and a high side power supply terminal for each of a load and a charger;

an overdischarge detecting circuit configured to detect the voltage across the secondary battery that is lower than a predetermined first voltage for overdischarge detection;

a control circuit configured to operate the drive circuit such that the gate of the discharge control NMOS transistor becomes at low level, upon detecting, by the overdischarge detecting circuit, that the voltage across the secondary battery is lower than the first voltage for overdischarge detection;

a low-voltage detecting circuit configured to detect the voltage across the secondary battery that is lower than a second voltage for low voltage detection, the second voltage being set to be lower than the first voltage for overdischarge detection;

an interrupt circuit configured to interrupt a node through which the control voltage is supplied to the gate of the charge control NMOS transistor, such that the node becomes at high impedance, upon detecting, by the low-voltage detecting circuit, that the voltage across the secondary battery is lower than the second voltage for low voltage detection; and a switching circuit configured to cause the gate of the charge control NMOS transistor to be fixed at a potential at the high side power supply terminal, upon detecting, by the low-voltage detecting circuit, that the voltage across the secondary battery is lower than the second voltage for low voltage detection.

2. The secondary battery protection circuit according to claim 1, wherein the low-voltage detecting circuit is configured to stop the boosting circuit upon detecting that the voltage across the secondary battery is lower than the second voltage for low voltage detection.

3. The secondary battery protection circuit according to claim 1, wherein the low-voltage detecting circuit includes a level shift circuit configured to adjust an output potential of the low-voltage detecting circuit to a potential at the high side power supply terminal, and wherein the switching circuit includes:
a first NMOS transistor whose gate is controlled according to the output of the level shift circuit;
a plurality of first PMOS transistors in which respective gates are commonly electrically coupled to be controlled by the first NMOS transistor and in which respective sources are commonly electrically coupled; and
a current source electrically coupled between a common connection gate and a common connection source, the common connection gate being the commonly electrically coupled respective gates of the first PMOS transistors and the common connection source being commonly electrically coupled respective sources of the first PMOS transistors.

4. The secondary battery protection circuit according to claim 3, wherein the level shift circuit includes a depletion NMOS transistor electrically coupled between an output node of the low-voltage detecting circuit and the high side power supply terminal.

5. The secondary battery protection circuit according to claim 1, wherein the drive circuit includes a CMOS inverter that includes a second PMOS transistor whose source is electrically coupled to an output node of the boosting circuit configured to generate the control voltage and output the control voltage, and that includes a second NMOS transistor whose source is electrically coupled to a ground of the boosting circuit, and wherein the interrupt circuit is configured to:
interrupt a path between the node being an output node of the CMOS inverter and the output node of the boosting circuit, such that the output node becomes at high impedance, in a state in which the voltage across the secondary battery is lower than the second voltage for low voltage detection and in which the control circuit is configured to output a low level signal to a gate of each of the second PMOS transistor and the second NMOS transistor, or interrupt a path between the node being an output node of the CMOS inverter and the ground of the boosting circuit, such that the output node becomes at high impedance, in a state in which the voltage across the secondary battery is lower than the second voltage for low voltage detection and in which the control circuit is configured to output a high level signal to a gate of each of the second PMOS transistor and the second NMOS transistor.

6. The secondary battery protection circuit according to claim 1, wherein the drive circuit includes a CMOS inverter that includes a second PMOS transistor whose source is electrically coupled to an output node of the boosting circuit configured to generate the control voltage and output the control voltage, and that includes a second NMOS transistor whose source is electrically coupled to a ground of the boosting circuit, and that includes a second NMOS transistor whose source is electrically coupled to the low electric potential part, wherein, in a state in which the voltage across the secondary battery is lower than the second voltage for low voltage detection and in which the control circuit is configured to output a low level signal to a gate of each of the second PMOS transistor and the second NMOS transistor, the interrupt circuit is configured to interrupt a path between the node being an output node of the CMOS inverter and the output node of the boosting circuit, such that the output node becomes at high impedance, and wherein the interrupt circuit includes a PMOS transistor between the output node of the CMOS inverter and the output node of the boosting circuit.

7. The secondary battery protection circuit according to claim 1, wherein the low-voltage detecting circuit includes a MOS transistor, and wherein the second voltage for low voltage detection is set based on a threshold voltage associated with the MOS transistor.

8. A secondary battery protection apparatus comprising:
the secondary battery protection circuit according to claim 1;
the charge control NMOS transistor electrically inserted in the current path that is between the positive electrode of the secondary battery and the high side power supply terminal for each of the load and the charger; and
the discharge control NMOS transistor electrically inserted in the current path.

9. A battery pack comprising:
a secondary battery including a positive electrode;
a charge control NMOS transistor electrically inserted in a current path that is between the positive electrode of the secondary battery and a high side power supply terminal for each of a load and a charger;

a discharge control NMOS transistor electrically inserted in the current path;

a boosting circuit configured to generate a control voltage in response to boosting a voltage across the secondary battery;

a drive circuit configured to supply the control voltage to a gate of the charge control NMOS transistor and a gate of the discharge control NMOS transistor;

an overdischarge detecting circuit configured to detect the voltage across the secondary battery that is lower than a predetermined first voltage for overdischarge detection;

a control circuit configured to operate the drive circuit such that the gate of the discharge control NMOS transistor becomes at low level, upon detecting, by the overdischarge detecting circuit, that the voltage across the secondary battery is lower than the first voltage for overdischarge detection;

a low-voltage detecting circuit configured to detect the voltage across the secondary battery that is lower than a second voltage for low voltage detection, the second voltage being set to be lower than the first voltage for overdischarge detection;

an interrupt circuit configured to interrupt a node through which the control voltage is supplied to the gate of the charge control NMOS transistor, such that the node becomes at high impedance, upon detecting, by the low-voltage detecting circuit, that the voltage across the secondary battery is lower than the second voltage for low voltage detection; and a switching circuit configured to cause the gate of the charge control NMOS transistor to be fixed at a potential at the high side power supply terminal, upon detecting, by the low-voltage detecting circuit, that the voltage across the secondary battery is lower than the second voltage for low voltage detection.

10. A method for controlling a secondary battery protection circuit, the secondary battery protection circuit including:

a boosting circuit configured to generate a control voltage in response to boosting a voltage across a secondary battery;

a drive circuit configured to supply the control voltage to a gate of a charge control NMOS transistor and a gate of a discharge control NMOS transistor, the charge control NMOS transistor and the discharge control NMOS transistor being electrically inserted in a current path that is between a positive electrode of the secondary battery and a high side power supply terminal for each of a load and a charger;

an overdischarge detecting circuit configured to detect the voltage across the secondary battery that is lower than a predetermined first voltage for overdischarge detection; and a control circuit configured to operate the drive circuit such that the gate of the discharge control NMOS transistor becomes at low level, upon detecting, by the overdischarge detecting circuit, that the voltage across the secondary battery is lower than the first voltage for overdischarge detection, the method comprising:

detecting the voltage across the secondary battery that is lower than a second voltage for low voltage detection, the second voltage being set to be lower than the first voltage for overdischarge detection;

interrupting a node through which the control voltage is supplied to the gate of the charge control NMOS transistor, such that the node becomes at high impedance, upon detecting that the voltage across the secondary battery is lower than the second voltage for low voltage detection; and fixing the gate of the charge control NMOS transistor at a potential at the high side power supply terminal, upon detecting that the voltage across the secondary battery is lower than the second voltage for low voltage detection.

* * * * *